Patented Dec. 19, 1950

2,534,466

UNITED STATES PATENT OFFICE 2,534,466

OCTAHYDROPHENANTHRENE - 2 - CARBOXYLIC ACIDS AND DERIVATIVES THEREOF

Karl Miescher, Riehen, Jules Heer, Binningen, and Jean-René Billeter and Georg Anner, Basel, Switzerland, assignors to Ciba Pharmaceutical Products, Inc., Summit, N. J.

No Drawing. Application April 13, 1948, Serial No. 20,824. In Switzerland January 10, 1944

3 Claims. (Cl. 260—520)

The present invention relates to a process for the preparation of octahydrophenanthrene-2-carboxylic acids and derivatives thereof. It is a continuation-in-part of our copending application Ser. No. 542,812, filed June 29, 1944, now U. S. Patent No. 2,459,834. The latter discloses a process for the preparation of hydrophenanthrene-2-carboxylic acids and derivatives thereof by reacting a 1-keto-hydrophenanthrene which contains in the 2-position, in addition to a hydrocarbon radical, a functionally converted carboxyl group, and in the 7-position a free phenolic hydroxy group or a substituent convertible into a free phenolic hydroxy group, with an organo-metal compound in order to introduce a hydrocarbon radical into the 1-position, eliminating the newly introduced tertiary hydroxyl group directly or indirectly, and, if desired, converting the functionally converted carboxyl group in the 2-position into a free carboxyl group and/or converting the substituent in the 7-position into a free hydroxyl group and hydrogenating non-aromatic carbon-to-carbon multiple bonds at any desired stage after the reaction with the organo-metal compound.

It is possible by the above process to obtain octahydrophenanthrene-2-carboxylic acids and derivatives thereof. However, the final products are obtained in the form of complex mixtures from which the highly active components can be isolated only with considerable losses, whereby the resultant yields are commensurately impaired.

The present invention is based on the observation that the foregoing difficulty can be circumvented and the desired final products obtained in good yield by using the 1-keto-octahydrophenanthrenes serving as starting materials in the form of the individual racemates or optical antipodes. The starting materials contain three asymmetrical carbon atoms, which correspond to 4 racemates or 8 optically active antipodes. The final products contain a further asymmetrical carbon atom so that the number of isomers is increased to 8 racemates or 16 optically active antipodes. Accordingly, as compared with the process of the aforesaid application, the present process has the advantage that, instead of a highly complex mixture from which the components are almost inseparable, there are formed at most 2 racemates when a homogeneous keto-ester racemate is used, or 2 optically active antipodes when a homogeneous optically active keto-ester is used, which racemates or antipodes can then be separated into the pure components without difficulty, for example, by fractional crystallization, chromatography or sublimation. By suitably selecting the reaction conditions the synthesis can be so conducted as to favor more strongly the formation of one of the two racemates or one of the two optical antipodes.

In other respects the starting materials may contain the same functional groups as those of the aforesaid application. Thus, they may contain in the 1-position a keto-group and in the 2-position a hydrocarbon radical, for example, an alkyl radical such as methyl, ethyl or propyl, or an alkenyl radical such as allyl, or a functionally converted carboxyl group, for example, a carbomethoxy, carbethoxy or carbobenzyloxy group. Furthermore, they may contain in the 7-position a free phenolic hydroxyl group or a substituent convertible into a free phenolic hydroxyl group. The latter substituent may be, for example, a hydroxyl group etherified by methanol, ethanol, a phenol, a benzyl alcohol or the like or a hydroxyl group esterified by an organic or inorganic acid, or a nitro or amino group or a halogen atom. It is preferable to start from sterically uniform 1-keto-2-methyl-7-alkoxy-1,2,3,4,9,10,11,12 - octahydrophenanthrene -2-carboxylic acid methyl esters, and particularly from the 1 - keto - 2 - methyl-7-methoxy-compounds. The racemic 1 - keto - octahydrophenanthrenes used as starting material can be obtained, for example, by fractional crystallization, chromatography or sublimation. The optically active compounds may be prepared from the racemates in the usual way. The reaction of the 1-keto-octahydrophenanthrenes in the present process may be carried out in the manner prescribed in the aforesaid application.

Thus, in order to introduce a hydrocarbon radical into the 1-position, for example, an alkyl radical such as methyl, ethyl or propyl, an alkenyl radical such as allyl, an aralkyl radical such as benzyl, or an alkinyl radical such as ethinyl, the starting material may be reacted in a first reaction with the corresponding organo-metal compound, for example, with an organomagnesium halide or organo-zinc halide, an alkyl- or alkinyl-alkali compound or the like. The newly introduced tertiary hydroxyl group may then be eliminated directly or indirectly from the resulting tertiary alcohols, if desired after hydrogenating any multiple bonds present in a side chain. This can be brought about, for example, with the formation of a carbon-to-carbon double bond. Thus, for example, water may be split off directly or the hydroxyl group may first be exchanged for halogen or another ester or ether residue. A hydroxyl group converted in this manner may then be eliminated, for example, by thermal decomposition or by treatment with an agent capable of splitting off acid or alcohol. The splitting off of the tertiary hydroxyl group, which results from the above mentioned reaction with the organo-metal compound, may also be brought about by the further action of an excess of the organo-metal compound at a raised temperature. The elimination of the hydroxyl group or the halogen atom may, however, also be brought about by reduction, for example, by means of hydrogen in the presence of a noble metal catalyst or by means of hydriodic acid in the presence of glacial acetic acid. The conversion of the functionally converted carboxyl group in the 2-position and/or of the substituent in the 7-position into a free carboxyl or hydroxyl group respectively, may be brought about, especially in the case of esters or ethers, by means of hydrolyzing agents. However, in the case of benzyl ethers, there may be used, for example, reducing agents. An amino group in the 7-position may be converted into a hydroxyl group by diazotization and boiling. When both of the said substituents in the 2- and 7-positions are to be converted into a free carbonxyl and hydroxyl group, respectively, this may be brought about in stages and in either order of succession.

In order to saturate non-aromatic multiple carbon-to-carbon bonds, especially double or triple bonds introduced by splitting off the tertiary hydroxyl group or by reaction with unsaturated organo-metal compounds, hydrogenation may be brought about at any desired stage of the process after the reaction with the organo-metal compound. For this purpose there may be used, for example, chemical methods such as catalytic or electrolytic hydrogention or hydrogenation with nascent hydrogen, or biochemical methods. When an unsaturated residue has been introduced, its multiple bond or a double bond formed by splitting off the tertiary hydroxyl group, may also be hydrogenated in two different stages of the process. In particular, the multiple bond introduced with the unsaturated residue may first be saturated with hydrogen, then the tertiary hydroxyl group eliminated with the formation of a double bond, and the latter subsequently hydrogenated.

When the resulting compounds contain free carboxyl groups they may be esterified, for example, directly, by means of diazo-methane or diazo-ethane or indirectly by way of the acid chloride or an alkali salt of the carboxylic acid in question. Finally, free phenolic hydroxy groups may be esterified or etherified in known manner. In this connection there may be mentioned esters with organic acids, especially aliphatic or aromatic acids, for example, acetic acid, propionic acid, butyric acid, palmitic acid, stearic acid or benzoic acid, or with sulfonic acids, polycarboxylic acids or carboxy-sulfonic acids, and finally with inorganic acids such as sulfuric acid or phosphoric acid or carbonic acid or derivatives of these acids. Among the ethers there are to be mentioned more especially, for example, the alkyl ethers such as the methyl, ethyl or propyl ethers, and the glucosides.

The free carboxylic acids may be converted into the carboxylic acid salts, for example, alkali metal salts, alkaline earth metal salts or ammonium salts. When the ester or ether residue in the 7-position contains basic groups, the corresponding salts with inorganic acids, for example also the betaine ester salts may be made. The aforesaid salts find application more especially in aqueous solution or for depotherapy.

The products of the invention may find application as medicaments or as intermediate products for the manufacture of medicaments.

The following examples illustrate the invention, the parts being by weight unless otherwise stated, and the relationship of parts by weight to parts by volume being the same as that of the gram to the cubic centimeter:

*Example 1*

6.04 parts of the 7-methoxy-1-oxo-2-methyl-1,2,3,4,9,10,11,12- octahydrophenanthrene-2- carboxylic acid methyl ester melting at 132–134° C. and having the formula

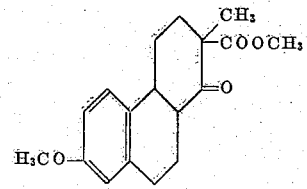

(obtained, for example, by the fractional crystallization of the racemate mixture of the crude 7-methoxy-1-oxo-2-methyl- 1,2,3,4,9,10,11,12- octahydrophenanthrene-2-carboxylic acid methyl ester) are dissolved in 75 parts by volume of benzene, and run at 0° C. with agitation into a Grignard solution obtained from 0.72 part of magnesium, 4.6 parts of ethyl iodide and 75 parts by volume of ether. The reaction mixture is then boiled for ½ hour in a reflux apparatus, cooled with ice, and decomposed with ice and hydrochloric acid. Then benzene-ether mixture, after being washed with water and dried leaves behind after evaporation a yellow colored thick oil. The latter can be distilled without decomposition at 175–180° C. under a pressure of 0.02 mm. The colorless oil so obtained is 7-methoxy-1-hydroxy-1- ethyl- 2- methyl - 1,2,3,4,9,10,11,12- octahydrophenanthrene-2-carboxylic acid methyl ester of the formula

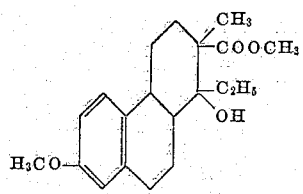

It crystallizes upon treatment with methanol. After recrystallization from the same solvent it melts at 102–103° C.

In order to eliminate water, 2.3 parts of the carbinol melting at 102–103° C. are dissolved in 20 parts by volume of pyridine, 4 parts by volume of phosphorus oxychloride are added, and the mixture is boiled for ½ hour in a reflux apparatus. After cooling, the whole is poured into ice, and the oily reaction product which is precipitated is taken up in ether. The ethereal solution is washed with hydrochloric acid and water, dried and evaporated. The residue is a pale brown oil, consisting of crude 7-methoxy-1-ethylidene- 2- methyl - 1,2,3,4,9,10,11,12 - octahydrophenanthrene-2-carboxylic acid methyl ester. In order to hydrolyze the carbomethoxy group the product is heated without purification in a mixture of 6 parts of potassium hydroxide and 20 parts by volume of alcohol of 95 per cent strength in an open vessel at 170–180° C. The resulting reaction mixture is diluted with water and extracted with ether. By mixing the aqueous alkaline solution so obtained with an excess of hydrochloric acid the unsaturated carboxylic acid is obtained. By fractional crystallization from acetone and methanol there are obtained from the latter product two isomeric 7-methoxy-1-ethylidene-2-methyl- 1,2,3,4,9,10,11,12- octahydrophenanthrene-2-carboxylic acids of the formula

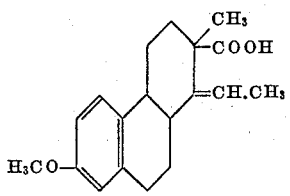

in the form of rhombic crystals melting at 195–197° C. and needles melting at 179–181° C. respectively.

4.8 parts of a mixture of these two isomeric unsaturated carboxylic acids are, for the purpose of hydrogenation of the double bond resulting from the elimination of water, dissolved in 450 parts by volume of methanol, and hydrogenated at room temperature in the presence of 4.8 parts of platinum oxide. When the absorption of hydrogen has ceased, the whole is filtered to remove the catalyst and the methanol solution is evaporated. The crystalline residue is dissolved in acetone, the solution is concentrated somewhat by evaporation, and allowed to crystallize. The resulting needles consist of 7-methoxy-1-ethyl-2- methyl- 1,2,3,4,9,10,11,12- octahydrophenanthrene-2-carboxylic acid melting at 227–229° C. and having the formula

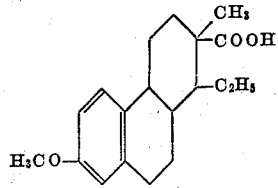

By evaporating the mother liquors from which the above acid is obtained and repeated recrystallization of the residue from methanol, there is obtained the isomeric 7-methoxy-1-ethyl-2- methyl- 1,2,3,4,9,10,11,12- octahydrophenanthrene-2-carboxylic acid melting at 187–188° C.

1 part of the methoxy-acid melting at 187–188° C. is heated with 10 parts of pyridine hydrochloride for 3 hours at 170–180° C. in order to hydrolyze the methoxy group. Hydrochloric acid and ether are added to the cooled melt, and the mixture is agitated. The ethereal solution is then washed in turn with hydrochloric acid, a small quantity of a saturated solution of sodium bicarbonate and water, dried, and evaporated, and after recrystallizing the residue from methanol, there is obtained 7-hydroxy-1-ethyl-2- methyl - 1,2,3,4,9,10,11,12 - octahydrophenanthrene-2-carboxylic acid in the form of prismatic platelets melting at 181–182° C. and having the formula

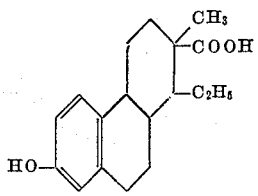

The methoxy-acid melting at 227–229° C., when treated in an analogous manner yields the isomeric 7 - hydroxy-1-ethyl-2-methyl-1,2,3,4,9,10,-11,12-octahydrophenanthrene-2-carboxylic acid, which after recrystallization from methanol melts at 175–177° C. and is in the form of glistening platelets.

The hydrolysis of the methoxy group can also be carried out by heating 1 part of the methoxy-acid in a mixture of 5 parts of potassium hydroxide and 12 parts by volume of methanol for 5 hours in a sealed tube at 200° C., and isolating the hydroxy-acid in the usual manner.

*Example 2*

10 parts of pulverized 7-methoxy-1-oxo-2-methyl - 1,2,3,4,9,10,11,12 - octahydrophenanthrene-2-carboxylic acid methyl ester melting at 132–134° C. are introduced at —50° C., while stirring, into a solution of sodium acetylide, prepared from 5 parts of sodium, 100 parts by volume of liquid ammonia, a slight excess of acetylene and 100 parts by volume of ether. After one hour the cooling mixture is removed, whereupon the ammonia slowly evaporates in the course of about 2 hours. An aqueous solution of ammonium chloride is added to the reaction mixture, and it is then extracted with ether. The ethereal solution is washed with aqueous ammonia solution and water, dried and evaporated. The residue is a snow white crystalline mass, which can be separated by fractional recrystallization from acetone and methanol into two 7-methoxy - 1 - hydroxy - 1 - ethinyl - 2 - methyl-1,2,3,4,9,10,11,12 - octahydrophenanthrene - 2-carboxylic acid methyl esters of the formula

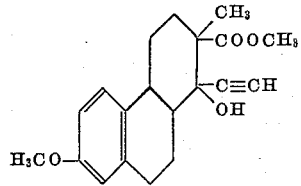

melting at 158–159° C. and 117–120° C. respectively.

In order to convert the ethinyl group into an ethyl group, 7.8 parts of the higher melting ethinyl-carbinol, which is not entirely free from the lower melting isomer, are hydrogenated in 250 parts by volume of methanol in the presence of 0.8 part of platinum oxide. When the calculated quantity of hydrogen has been absorbed the hydrogenation ceases. The catalyst is then removed by filtration, and the methanol solution is strongly concentrated. Upon cooling, more than 7 parts of the 7-methoxy-1-hydroxy-1-ethyl - 2 - methyl - 1,2,3,4,9,10,11,12 - octahydrophenanthrene - 2 - carboxylic acid methyl ester melting at 102–103° C. described in Example 1, crystallizes.

Example 3

By the procedure described in Example 2, 1.5 parts of the racemate of 7-methoxy-1-oxo-2-methyl-1,2,3,4,9,10,11,12-octahydrophenanthrene-2-carboxylic acid methyl ester melting at 86–88° C. suspended in ether are reacted with a solution of sodium acetylide prepared from 0.5 part of sodium, 30 parts by volume of liquid ammonia and a small excess of acetylene. The reaction product, which after recrystallization from a mixture of acetone and methanol crystallizes in prisms, is 7-methoxy-1-hydroxy-1-ethinyl-2-methyl-1,2,3,4,9,10,11,12-octahydrophenanthrene-2-carboxylic acid methyl ester melting at 139–141° C.

1 part of the latter carbinol is then hydrogenated in 50 parts by volume of alcohol in the presence of 0.1 part of a platinum catalyst to form 7-methoxy-1-hydroxy-1-ethyl-2-methyl-1,2,3,4,9,10,11,12-octahydrophenanthrene-2-carboxylic acid methyl ester, which after recrystallization from methanol is obtained in the form of needles melting at 112.5–114° C. From the latter, the two isomeric 7-methoxy-1-ethyl-2-methyl-1,2,3,4,9,10,11,12-octahydrophenanthrene-2-carboxylic acids which melt respectively at 179–181° C. and 189–191° C. may be obtained in the manner described in Example 1.

In an analogous manner the addition of acetylene and hydrogenation of the acetylenic triple bond can be carried out with other 1-keto-octahydrophenanthrenes, for example, the racemates of 7-methoxy-1-oxo-2-methyl-1,2,3,4,9,10,11,12-octahydrophenanthrene-2-carboxylic acid methyl ester melting at 101–102° C. and 127–128° C., respectively. The resulting products are then converted into the corresponding octahydrophenanthrene-2-carboxylic acids by the procedure described in Example 1. Thus, for example, the 7-methoxy-1-ethyl-2-methyl-1,2,3,4,9,10,11,12-octahydrophenanthrene-2-carboxylic acid which melts at 213–215° C. and which, upon splitting of the methoxy group, yields the corresponding hydroxy-acid which melts at 212–214° C., may be obtained from the 7-methoxy-1-oxo-2-methyl-1,2,3,4,9,10,11,12-octahydrophenanthrene-2-carboxylic acid methyl ester which has a melting point of 127–128° C.

Example 4

2.3 parts of the 7-methoxy-1-ethyl-2-methyl-1,2,3,4,9,10,11,12-octahydrophenanthrene-2-carboxylic acid melting at 227–229° C. described in Example 1 are suspended in 50 parts by volume of benzene, and 5 parts by volume of oxalyl chloride are introduced dropwise. After heating up for a short time the reaction becomes vigorous. The whole is allowed to stand overnight at room temperature, and then the solvent is evaporated under reduced pressure. The residue obtained in the form of a pale yellow oil crystallizes on the addition of petroleum ether. After recrystallization from a mixture of benzene and petroleum ether the 7-methoxy-1-ethyl-2-methyl-1,2,3,4,9,10,11,12-octahydrophenanthrene-2-carboxylic acid chloride of the formula

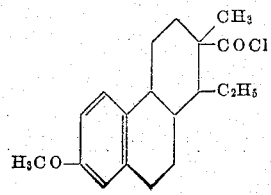

melts at 90–91° C. 2 parts of the acid chloride melting at 90–91° C. are melted in an atmosphere of nitrogen with 2 parts of l-menthol in an oil bath having a temperature of 110° C. At an oil bath temperature of about 120° C. a vigorous evolution of hydrogen chloride occurs, and this ceases after 1 hour. The cooled melt is dissolved in a mixture of benzene and petroleum ether, and chromatographed over 50 parts of aluminium oxide. By elutriating with petroleum ether and evaporating the solvent the pure 7-methoxy-1-ethyl-2-methyl-1,2,3,4,9,10,11,12-octahydrophenanthrene-2-carboxylic acid l-menthyl ester is obtained in the form of a colorless oil.

The above described acid chloride reacts in a similar manner, for example, with alcohols, amino alcohols, hydroxyacids or phenols with the formation of the corresponding esters. The esterification of the carboxyl group may be carried out by heating a salt, for example, the sodium salt of the carboxylic acid, with an appropriate halogen compound.

Example 5

1 part of the 7-hydroxy-1-ethyl-2-methyl-1,2,3,4,9,10,11,12-octahydrophenanthrene-2-carboxylic acid melting at 181–182° C. described in Example 1 is mixed with a small excess of an ethereal solution of diazo-methane. The resulting 7-hydroxy-1-ethyl-2-methyl-1,2,3,4,9,10,11,12-octahydrophenanthrene-2-carboxylic acid methyl ester obtained in the form of an oil after evaporation of the solvent is dissolved, without purification, in 30 parts by volume of a 2 N-aqueous solution of sodium hydroxide, and vigorously agitated after the addition of a small excess of dimethyl-sulfate. The precipitated oil is taken up in ether, the ethereal solution is agitated with sodium hydroxide solution, and water, and after drying the solution, the solvent is evaporated. By recrystallizing the residue from methanol, 7-methoxy-1-ethyl-2-methyl-1,2,3,4,9,10,11,12-octahydrophenanthrene-2-carboxylic acid methyl ester melting at 120–121° C. and having the formula

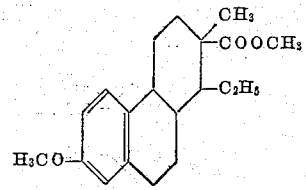

is obtained. The identical compound may be obtained by direct esterification by means of diazomethane of the methoxy-acid, melting at 187–188° C., described in Example 1. The 7-methoxy-1-ethyl-2-methyl-1,2,3,4,9,10,11,12-octahydrophenanthrene-2-carboxylic acid methyl esters corresponding to the hydroxy-acids which melt at 175–177° C. (Example 1) and 212–214° C. (Example 3), themselves melt at 49–50° C. and 91–92° C., respectively.

The etherification of the phenolic hydroxyl group can also be brought about by heating a salt thereof, for example, an alkali salt, with the appropriate halide.

Example 6

1 part of the crude 7-hydroxy-1-ethyl-2-methyl-1,2,3,4,9,10,11,12-octahydrophenanthrene-2-carboxylic acid methyl ester obtained by the procedure described in Example 5 is dissolved in 10 parts by volume of pyridine, and, after the addition of 10 parts by volume of acetic anhydride, the mixture is heated on the water bath for 5 hours. After cooling, the whole is poured into water, extracted with ether, and the ethereal solution is washed in turn with hydrochloric acid, sodium bicarbonate solution and water, dried, and distilled. By recrystallizing the residue from methanol, 7-acetoxy-1-ethyl-2-methyl - 1,2,3,4,9,10,11,12-octahydrophenanthrene-2-carboxylic acid methyl ester melting at 92–93° C. and having the formula

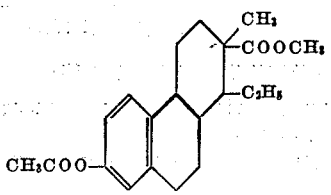

is obtained.

In a similar manner the 7-hydroxy-1-ethyl-2 - methyl - 1,2,3,4,9,10,11,12 - octahydrophenanthrene-2-carboxylic acid melting at 181–182° C. described in Example 1 can be acetylated in the 7-position.

For the production of esters more highly esterified in the 7-position the appropriate higher acid halides are advantageously used in the presence of an organic base, for example, pyridine.

*Example 7*

A solution of 12 parts of 7-methoxy-1-oxo-2-methyl-1,2,3,4,9,10,11,12-octahydrophenanthrene-2-carboxylic acid methyl ester melting at 132–134° C. in 150 parts by volume of benzene is run at 0° C., while thoroughly stirring, into a Grignard solution prepared from 1.4 parts of magnesium, 8.4 parts of methyl iodide and 150 parts by volume of ether. The reaction mixture so obtained is then boiled for a further ½ hour in a reflux apparatus, then cooled, and decomposed with ice and dilute hydrochloric acid. After the addition of ether the benzol-ether layer is washed with water, dried and evaporated. The residue is a yellow oil which crystallizes in the form of needles upon the addition of methanol. After recrystallization from methanol, the 7-methoxy-1-hydroxy-1,2-dimethyl-1,2,3,4,9,10,11,12-octahydrophenanthrene-2-carboxylic acid methyl ester of the formula

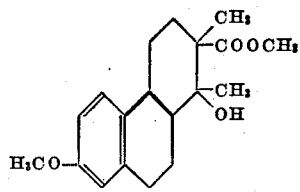

melts at 125–126° C.

For the purpose of splitting off water, 2.5 parts of the latter carbinol melting at 125–126° C. are boiled for ½ hour in a mixture of 25 parts by volume of pyridine and 2.5 parts by volume of phosphorus oxychloride. After cooling, the whole is poured onto ice and hydrochloric acid, extracted with ether, and the ether evaporated after washing the ethereal solution with water and drying it. The residue crystallizes immediately after the addition of methanol. By further recrystallization from methanol there is obtained therefrom pure 7-methoxy-1-methylene-2-methyl-1,2,3,4,9,10,11,12-octahydrophenanthrene - 2 - carboxylic acid methyl ester of the formula

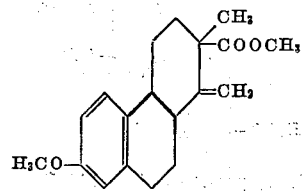

in the form of platelets melting at 115–116° C.

Alternatively, water may be split off by boiling 1 part of the carbinol in a mixture of 1 part of oxalic acid and 10 parts of glacial acetic acid for several hours in a reflux apparatus.

In order to hydrolyze the carbomethoxy group, 2.5 parts of the crude product resulting from the splitting off of water are dissolved in 10 parts by volume of alcohol, and, after the addition of 7.5 parts of potassium hydroxide, heated at about 170° C. in an open vessel until the potassium salt precipitates in solid form. The cooled melt is dissolved in water, and small quantities of a neutral portion are extracted from the alkaline solution by means of ether. The aqueous alkaline layer is then acidified, and the acid which is precipitated in crystalline form is fractionated by recrystallization from a mixture of acetone and methanol. In this manner there is obtained mainly the 7-methoxy-1-methylene-2-methyl-1,2,3,4,9,10,11,12-octahydrophenanthrene-2-carboxylic acid melting at 185–187° C. which crystallizes in the form of prismatic plates. From the mother liquor the isomeric acid can be isolated in the form of rhombic crystals melting at 167–168° C.

8 parts of a mixture of the two unsaturated acids melting at 185–187° C. and 167–168° C., respectively are dissolved in 1000 parts by volume of methanol and hydrogenated in the presence of 8 parts of a platinum catalyst at room temperature. After the quantity of hydrogen calculated as one molecular equivalent has been absorbed the hydrogenation ceases. The catalyst is then removed by filtration, and the methanol solution is evaporated. By fractional crystallization from acetone and methanol, there are obtained from the residue two 7-methoxy-1,2-dimethyl-1,2,3,4,9,10,11,12-octahydrophenanthrene-2-carboxylic acids of the formula

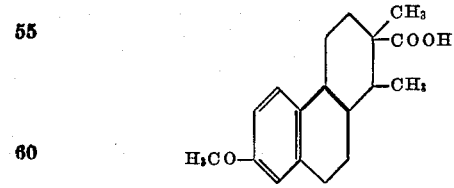

melting at 205–207° C. and 198–200° C. respectively.

The Grignard reaction and the further reactions in accordance with the preceding examples may be carried out starting from other 1-keto-octahydrophenanthrenes, for example, starting from the racemates of 7-methoxy-1-oxo-2-methyl-1,2,3,4,9,10,11,12-octahydrophenanthrene - 2 - carboxylic acid methyl ester melting at 86–88° C., 100–102° C. and 127–128° C.

Having thus disclosed the invention, what is claimed is:

1. The racemic 7-methoxy-1-ethyl-2-methyl- 1,2,3,4,9,10,11,12-octahydrophenanthrene-2-carboxylic acid of the formula

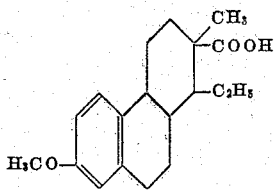

having a melting point of 187–188° C.

2. The racemic 7-methoxy-1-ethyl-2-methyl-1,2,3,4,9,10,11,12-octahydrophenanthrene-2-carboxylic acid of the formula

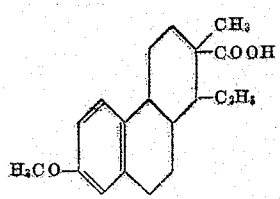

having a melting point of 189–191° C.

3. A member selected from the group consisting of racemic 7-methoxy-1-ethyl-2-methyl-1,2,3,4,-9,10,11,12-octahydrophenanthrene-2 - carboxylic acids which correspond to the formula

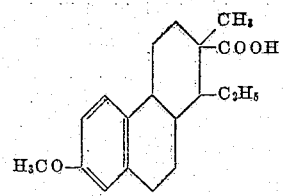

and which have a melting point of 187–188° C. and 189–191° C., respectively.

KARL MIESCHER.
JULES HEER.
JEAN-RENÉ BILLETER.
GEORG ANNER.

REFERENCES CITED

The following references are of record in the file of this patent:

UNITED STATES PATENTS

| Number | Name | Date |
|---|---|---|
| 2,069,096 | MacCorquodale et al. | Jan. 26, 1937 |

OTHER REFERENCES

Karrer: "Organic Chemistry" (Nordeman), pp. 91–92 (1938).

Anner et al.: Hev. Chim. Acta, vol. 30, pages 1422–1431 (1947).